United States Patent
Verdonk (12)
(10) Patent No.: US 6,330,454 B1
(45) Date of Patent: Dec. 11, 2001

(54) SYSTEM AND METHOD FOR LOCATING MOBILE UNITS OPERATING WITHIN A WIRELESS COMMUNICATION SYSTEM

(75) Inventor: Timothy C. Verdonk, Redmond, WA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/280,263

(22) Filed: Mar. 29, 1999

Related U.S. Application Data (63) Continuation-in-part of application No. 09/223,889, filed on Dec. 31, 1998.

(51) Int. Cl.[7] ........................................ H04Q 7/20
(52) U.S. Cl. ........................ 455/456; 455/457; 455/404
(58) Field of Search ........................... 455/404, 456, 455/422, 435, 461, 457, 458; 701/207, 209; 342/357.08, 450, 451

(56) References Cited

U.S. PATENT DOCUMENTS

| | | | |
|---|---|---|---|
| 5,049,873 | * 9/1991 | Robins et al. | 340/825.06 |
| 5,327,144 | * 7/1994 | Stilp et al. | 342/387 |
| 5,485,163 | 1/1996 | Singer et al. | |
| 5,519,760 | * 5/1996 | Borokowski et al. | 379/59 |
| 5,659,596 | * 8/1997 | Dunn | 455/456 |
| 6,014,377 | * 8/1998 | Gillespie | 370/351 |
| 6,052,597 | * 4/2000 | Elkstrom | 455/456 |
| 6,073,012 | * 6/2000 | Vanden Heuval et al. | 455/427 |
| 6,185,426 | * 2/2001 | Alpervoich et al. | 455/456 |

FOREIGN PATENT DOCUMENTS

| | | |
|---|---|---|
| 2317305 | 3/1998 | (GB) . |
| WO 9208327 | 5/1992 | (WO) . |
| WO 96/26614 | 8/1996 | (WO) . |
| WO 98/52379 | 11/1998 | (WO) . |

\* cited by examiner

*Primary Examiner*—Dwayne Bost
*Assistant Examiner*—Lewis West
(74) *Attorney, Agent, or Firm*—Bruce Garlick; James Harrison (57) ABSTRACT

A wireless communication system constructed according to the present invention interfaces with a Service Control Point (SCP) to provide location information for a serviced mobile unit. The SCP sends a locate request to a Home Location Register (HLR) of the wireless communication system, requesting the location of the serviced mobile unit. The HLR then accesses a serving Mobile Switching Center (MSC), the serving MSC being identified by the HLR as currently servicing the mobile unit. Depending upon the particular constraints of the requested operation by the SCP (e.g., immediate locate request or most recent locate request), the serving MSC either retrieves location information for the mobile unit from its Visitor Location Register (VLR) or sends a page to the mobile unit. The mobile unit responds to the page and, based upon the cell/sector from which the mobile unit responded, the serving MSC determines an approximate location of the mobile unit. With the location information retrieved, the serving MSC then converts the cell/sector identification to longitude and latitude information. The serving MSC may also convert a time-stamp associated with the location information (when the location information was recorded) to a normalized time standard such as Greenwich Standard Time. With this location information determined, the serving MSC provides the information to the requesting SCP. This information may be provided either directly by the serving MSC to the requesting SCP or may be provided via the HLR that receive the request. In converting the cell/sector identification in which the mobile unit was last located, the serving MSC (or other element of the wireless communication system that performs the conversion) provides the most likely location of the mobile unit within the cell/sector.

15 Claims, 6 Drawing Sheets

FIG. 6B

SYSTEM AND METHOD FOR LOCATING MOBILE UNITS OPERATING WITHIN A WIRELESS COMMUNICATION SYSTEM

CROSS-REFERENCE TO RELATED APPLICATION

The present application is a continuation-in-part of, and claims priority pursuant to 35 U.S.C. Sec. 120 to U.S. application Ser. No. 09/223,889, filed Dec. 31, 1998, pending, which is hereby incorporated herein by reference in its entirety.

BACKGROUND

1. Technical Field

The present invention relates generally to wireless communication systems; and more particularly to a wireless communication system that may be accessed via a service control point by a customer application to determine the approximate location of a mobile unit operating within the wireless communication system.

2. Related Art

Cellular wireless communication systems are generally known in the art to facilitate wireless communications within respective service coverage areas. Such wireless communication systems include a "network infrastructure" that facilitates the wireless communications with mobile units operating within a service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC) which also couples to the PSTN, the Internet and/or to other MSCs.

A wireless mobile unit operating within the service coverage area communicates with one or more of the base stations. The base stations route the communications to the MSC via a serving BSC. The MSC routes the communications to another subscribing wireless unit via a BSC/base station path (which may be the same BSC/base station path when the communications are with another subscribing unit serviced by the same base station) or via the PSTN/Internet/other network to terminating destination.

Various operating standards have been developed to standardize wireless communications. The wireless communication operating standards include, for example, the Advanced Mobile Phone Service (AMPS) standards, the Global Standards for Mobile Communications (GSMC), the Code Division Multiple Access (CDMA) standards and the Time Division Multiple Access (TDMA) standards. A standard that is employed in North America for interconnectivity of MSCs is the IS-41 standard. These operating standards set forth the technical requirements that facilitate compatible operation between equipment of differing vendors.

Mobile units are used for many differing applications. In many applications, they simply serve as telephones for their users. However, in other applications, they take the place of two-way radios. A particular example of such usage is when mobile units are provided to delivery or service personnel. The mobile units are used primarily for communication between a central office and the worker when the worker is dispatched. In such applications, the central office is frequently interested in the present location of the worker for scheduling purposes and progress updates. To determine a present location of the worker, the central office must call the worker via the mobile unit and request his or her present location. Such technique not only delays the worker but requires a central office person to complete the communication, retrieve the location information and update the worker's status.

Other applications also require location information. For example, when a mobile unit is employed to create a data link between a user and a remote computerized application, the location of the mobile unit is typically required by the remote computerized application, such as automobile navigation services. A technique used to provide the location information is to incorporate a Global Positioning System (GPS) receiver in the automobile, to couple the GPS receiver to a local computer system to record the GPS location of the automobile and to relay the GPS location to the remote computerized application via the mobile unit. Such an application, while appropriate for navigation services since exact coordinates are typically required, is expensive, requires substantial overhead and consumes significant wireless bandwidth.

Thus, there is a need in the art for a system that allows a central location to determine the location of a mobile unit without dedicated overhead or substantial wireless bandwidth consumption.

SUMMARY OF THE INVENTION

Thus, to overcome the shortcomings of the prior systems, among other shortcomings, a wireless communication system constructed according to the present invention interfaces with a Service Control Point (SCP) to provide location information for a serviced mobile unit. In a typical operation, the SCP sends a locate request to a Home Location Register (HLR) of the wireless communication system, requesting the location of the serviced mobile unit. The HLR then accesses a serving Mobile Switching Center (MSC), the serving MSC being identified by the HLR as currently servicing the mobile unit.

Depending upon the particular constraints of the requested operation by the SCP (e.g., immediate locate request or most recent locate request), the serving MSC either retrieves location information for the mobile unit from its Visitor Location Register (VLR) or sends a page to the mobile unit. The mobile unit responds to the page and, based upon the cell/sector from which the mobile unit responded, the serving MSC determines an approximate location of the mobile unit.

With the location information retrieved, the serving MSC then converts the cell/sector identification to longitude and latitude information. The serving MSC may also convert a time-stamp associated with the location information (when the location information was recorded) to a normalized time standard such as Greenwich Standard Time. With this location information determined, the serving MSC provides the information to the requesting SCP. This information may be provided either directly by the serving MSC to the requesting SCP or may be provided via the HLR that receive the request.

In converting the cell/sector identification in which the mobile unit was last located, the serving MSC (or other element of the wireless communication system that performs the conversion) provides the most likely location of the mobile unit within the cell/sector. A typical cell/sector extends across a large geographic area. Resultantly, the mobile unit could reside at any location within its current cell/sector. Thus, in converting the cell/sector ID to a most likely longitude and latitude for the mobile unit, serving MSC makes educated approximations. As one approximation, the serving MSC determines the center of area for the cell/sector and assumes that the mobile unit resides at that location. As another approximation, if cell/sector services a heavily traveled road, for example, the serving MSC determines a mean location on the road and assumes that the mean location is where the mobile unit resides. Other techniques may also be applied to best approximate the mobile unit within the cell/sector from which the mobile unit responded.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
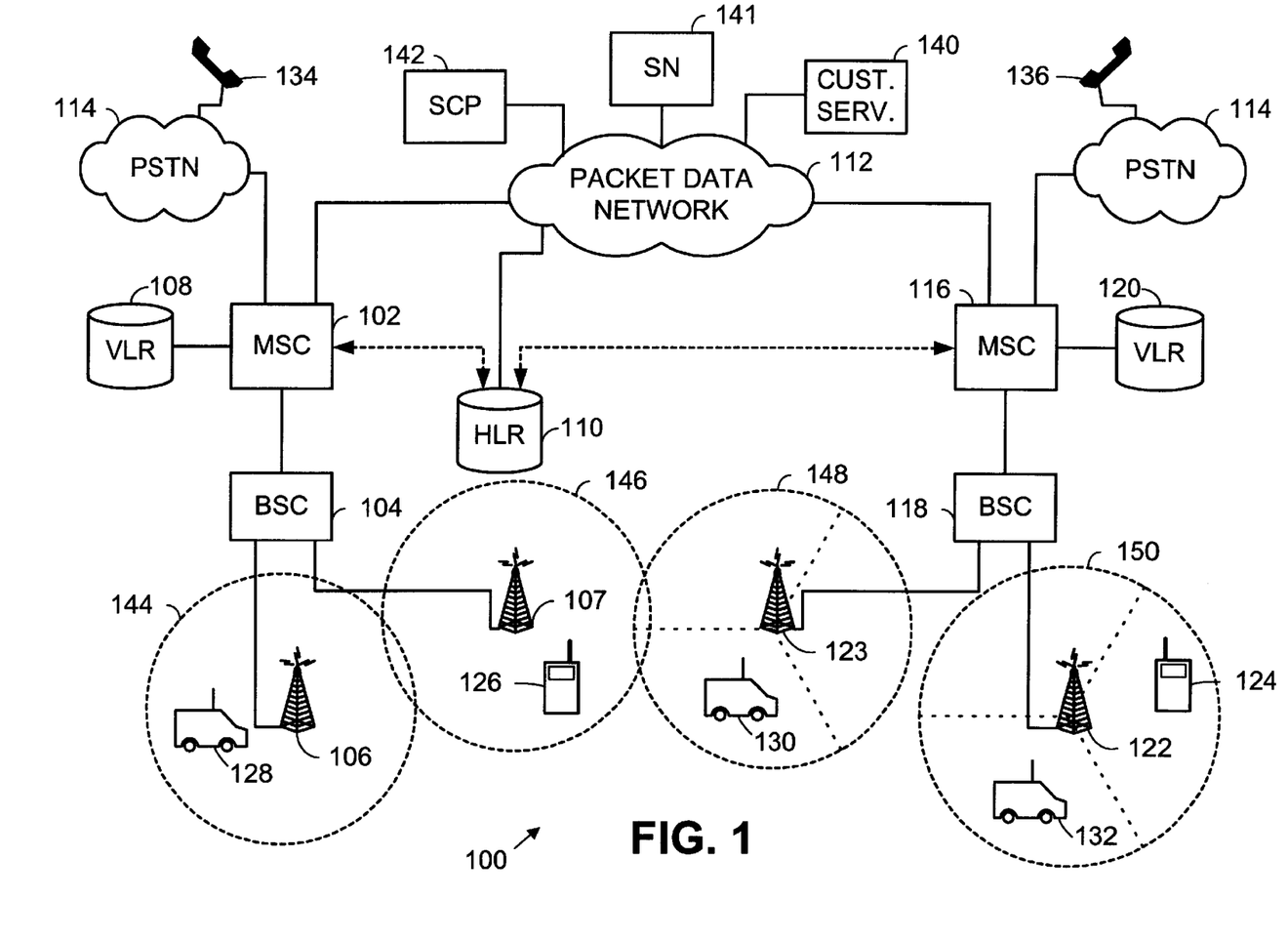
FIG. 1 is a system diagram illustrating generally the structure of a wireless communication system constructed according to the present invention.

FIG. 1 is a system diagram illustrating generally the structure of a wireless communication system constructed to the present invention. The wireless communication system 100 includes mobile switching centers (MSCs) 102 and 116. Coupled to each MSC 102 and 116 is at least one base station controller (BSC). For example, BSC 104 is shown to be coupled to MSC 102 while BSC 118 is coupled to MSC 116. Finally, at least one base station couples to each BSC. As shown, base stations 106 and 107 couple to BSC 104 and provide wireless service within respective cells/sectors while base stations 122 and 123 couple to BSC 118 and provide wireless service within respective cells/sectors. The construction of cellular based wireless communication systems is generally known. Thus, the structure of such cellular wireless communication systems will not be discussed other than to explain the teachings of the present invention.

Each of the MSCs 102 and 116 is serviced by a visitor location register (VLR), 108 and 120, respectively. Further, each of the MSCs 102 and 116 couples to a home location register (HLR) 110, which stores subscriber information. The construction of VLRs and HLRs is also generally known. Thus, the operation of the VLRs and HLRs will not be discussed herein except as it applies to operation according to the present invention. A signaling path between the MSCs 102 and 116 and the HLR 110 is shown as a dotted line while the traffic paths between the MSCs 102 and 116 and the PSTN 114 are shown as solid lines. Communications between the MSCs 102 and 116 and the HLR 110 may be compliant with the IS-41 standard promulgated for North American intersystem operations.

Each of the MSCs 102 and 116 also couples to the public switched telephone network (PSTN) 114. Terminals 134 and 136 couple to the PSTN 114 and may access the wireless communication system 100 thereby. The MSCs 102 and 116 and the HLR 110 also couple to a packet data network (e.g., the Internet). While not shown, the MSCs 102 and 116 typically require an interface, such as an Interworking function, to interface with the packet data network 112. As is known, most wireless communication systems support circuit switching, as opposed to the packet switching supported by the packet data network 112, such difference necessitating the Interworking function.

Coupled to the packet data network 112 are a customer server 140, a Service Node (SN) 141 and a Service Control Point (SCP) 142. The SN 141 includes a SCP and an Intelligent Peripheral, neither of which is shown specifically but whose functions are generally known. Generally, the SCP contained in the SN 141 and the separate SCP 142 support signaling functions for the system. Alternatively, the Intelligent Peripheral provides service resource functions. Examples of such service resource functions included call termination, DTMF receipt for automated services, voice actuated dialing, etc. These services require terminating a call. Thus, the Intelligent Peripheral services traffic as opposed to signaling.

The customer server 140 supports packet data switching and may support various client functions such as web page services, email, etc. According to the present invention, the customer server 140 accesses the wireless communication system 100 via the packet data network 112 to retrieve location information for mobile units. The customer server 140 may be used by a parcel delivery service, a service company or other businesses that dispatch employees to the field to perform tasks on behalf of the company, for example. Vehicle mounted mobile units 128, 130 and 132 may be assigned to delivery vans by a parcel delivery company while hand-held mobile units 124 and 126 may be assigned to service repair personnel by a service company. In both cases, the respective companies have a business interest in determining the location of their personnel at any time.

In an operation according to the present invention, the parcel delivery company is interested in expedited pickup of a parcel. However, the company would like to dispatch the closest mobile unit, 128, 130 or 132, to make the pickup. In order to determine which mobile unit 128, 130 or 132 is closest to the pickup location, the company desires to determine the location of each mobile unit. Thus, the company initiates location determination operations via the customer server 140. Such initiation may be performed automatically when the pickup request is phoned into the customer server 140 or may be performed manually at a console supported by the customer server 140.

A location determination for mobile unit 128 is discussed in particular. However, the same or similar operations are performed for mobile units 130 and 132 in the present example. Upon the initiation of the location determination, the customer server 140 sends a location determination request to the SCP 142 (or SN 141) via the packet data network 112. This location determination request includes the MIN (or cellular telephone number) of the mobile unit 128, e.g., (425) 555-2383. This location determination request also contains additional parameters relating to desired information. In one operation, the location determination request requests that a location be returned that represents the last location in which the mobile unit 128 registered (e.g., for a Location Area registration update or periodic registration update). In another operation, the location determination request requests that a present location of the mobile unit be returned. Subsequent operations will depend upon the option selected. As is appreciated, the operator of the wireless communication system 100 will charge for this service and would likely charge a higher rate to return a present location of the mobile unit, as compared to a last known location of the mobile unit.

The SCP 142 receives the location determination request and sends a locate request to either the HLR 110 or to an originating MSC, e.g., MSC 116. If the originating MSC 116 receives the location determination request, it sends a locate request to the HLR 110 that includes the MIN of the mobile unit 128. Included in this locate request (and route request described below) are parameters that indicate that location information is to be returned, instead of a TLDN for the mobile unit. The locate request (and route request) also may include an option that indicates whether a last known location or present location of the mobile unit 128 is to be returned.

The HLR 110 then determines that the mobile unit 128 is currently being serviced by serving MSC 102. Based upon this determination, the HLR 110 sends a route request to the serving MSC 102 which includes the MIN for the mobile unit and the type of location information to be determined. The serving MSC 102 receives the route request and accesses its VLR 108 to determine that the last known location of the mobile unit was in cell 144 being serviced by base station 106 and BSC 104. If the location information to be determined simply requests the last known location of the mobile unit 128, the serving MSC 102 returns the location information retrieved from the VLR 108, converting the cell/sector ID to longitude and latitude information as required. Typically, the serving MSC 102 will also return a time stamp for the location information, such time stamp indicating at what time the location was last determined.

If the location information to be determined requires that a current location of the mobile unit 128 be found, the serving MSC 102 initiates a page to the mobile unit 128, with the mobile unit 128 responding via base station 106 and BSC 104. Based upon this response to the page, the serving MSC 102 determines particularly that the mobile unit 128 resides within cell 144. With the location information determined by the serving MSC 102, the serving MSC 102 responds to the HLR 110 (or directly to the SCP 142) with the location information. The SCP 142 then responds to the customer server 140 via the packet data network 112.

Under the IS-41 standards, operation according to the present invention may be accomplished by enhancing the existing TerminationType parameter with two new values to indicate "last access" (retrieve location from VLR) or "current coverage" (page unit to determine its location). As will be described further below, when the "last access" cell partition is requested, the location information will be retrieved from the VLR 108 and send in a LOCAID parameter to the HLR 110 and relayed to the SCP 142 in a locreq message. If the "current coverage" location is requested, the serving MSC 102 will page the mobile unit 128 using a page message or audit order, determine the current coverage cell/sector and relay this information to the SCP 142 via the HLR 110. Thus, modifications may be made to the IS-41 standards to support operation according to the present invention.

In determining the location of a mobile unit, e.g., mobile unit 124, 126, 130 or 132, the information obtainable is the cell or sector in which the mobile unit currently operates or was last registered. As is known, cells/sectors may cover relatively large or relatively small geographic areas. Thus, the serving MSC, e.g., 102 or 116, must convert the cell/sector information to longitude and latitude information that is of use to the customer server 140. In a conversion operation according to the present invention, assumptions are made as to the location of any mobile unit operating within the cell or sector.

A first conversion operation assumes that the mobile unit resides within a center of area of the cell/sector. For example, base stations 106 and 107 support wireless coverage within a complete cell and do not support sectors. In such case, the center of area is at the location of the base stations, base stations 106 and 107 for cells 144 and 146, respectively. However, in the case of cells 148 and 150 supported by base stations 123 and 122, respectively, the cells 148 and 150 are sectorized. In such case, resolution is enhanced because the location of a mobile unit may be determined within a particular sector of the cells.

The prior methodology may be carried out for the sectors by determining a center of area for the sectors and assuming that the mobile unit, e.g., mobile unit 124, 130 and 132 reside at the center of area location within the respective sectors in which they operate. According to this technique, a longitude and latitude are determined for the center of area position and employed for each mobile unit responding for such cell or sector. Other techniques that may be employed are discussed with reference to FIG. 6.

Figure 2:
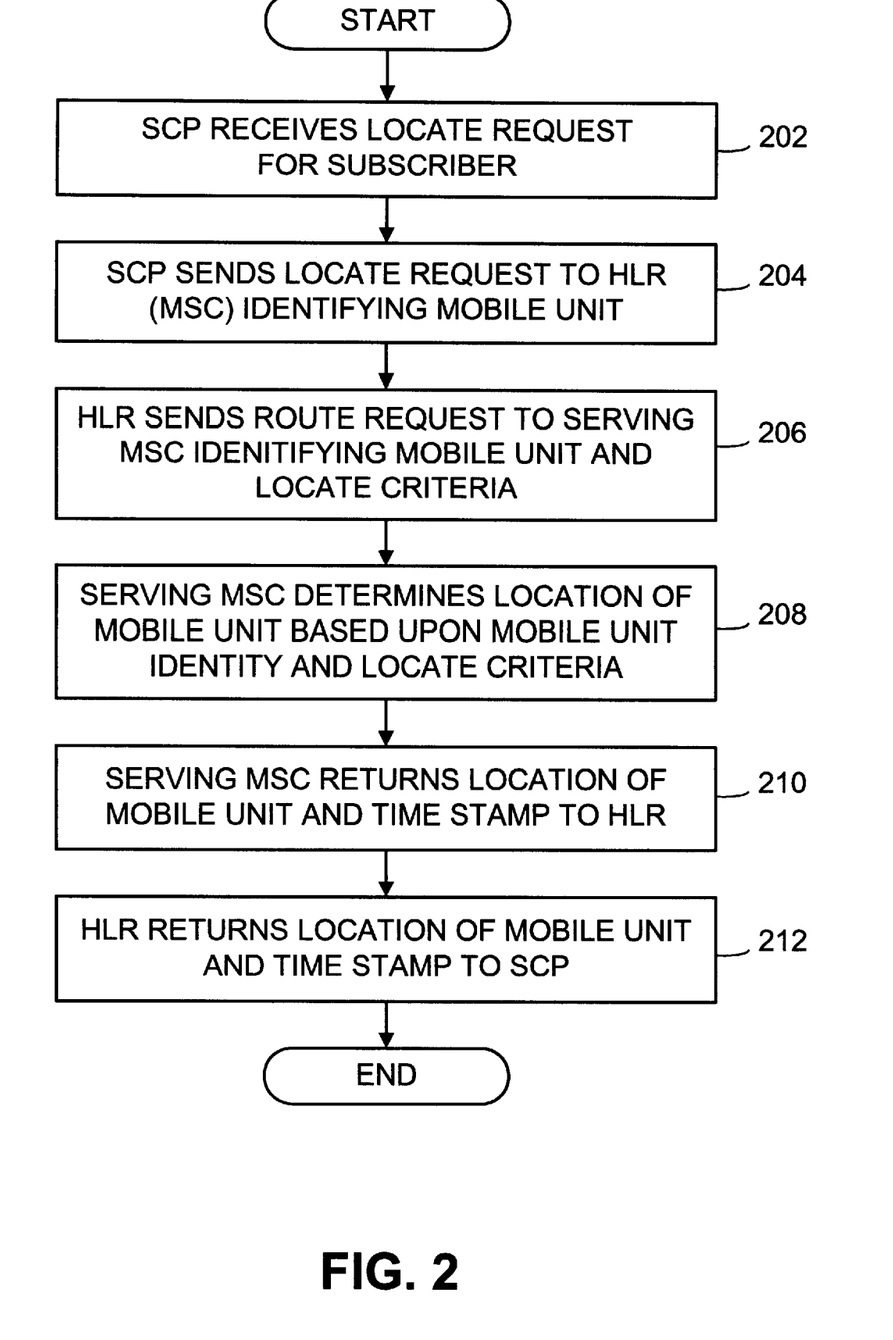
FIG. 2 is a logic diagram illustrating operation of a wireless communication system according to the present invention in which the approximate location of a mobile unit is determined.

FIG. 2 is a logic diagram illustrating operation of a wireless communication system according to the present invention in which the approximate location of a mobile unit is determined. Operation commences at step 202 where the SCP receives a locate request for a subscriber, perhaps via a packet data network from a subscriber computer (customer server). Based upon the locate request, the SCP sends a locate request (which may be in a different format as compared to the locate request sent by the SCP) to the HLR (or originating MSC) identifying the mobile unit at step 204. Typically, the HLR or originating MSC is determined based upon either the MIN of a mobile unit in question or the telephone number of the mobile unit.

At step 206, the HLR sends a route request to the serving MSC for the mobile unit, identifying the mobile unit and the locate criteria. Such locate criteria will typically include whether the serving MSC should return a current location of the mobile unit (as discovered by paging the mobile unit) or return the location of the mobile unit of its last access of the wireless communication system. Based upon the locate criteria, the serving MSC determines the location of the mobile unit at step 208. In determining the location of the mobile unit, the serving MSC will typically convert the cell/sector in which the mobile unit operates (or operated at its last known location) to a longitude and latitude. The serving MSC then returns this location information (longitude and latitude) along with a time stamp (in a standard time format such as Greenwich Standard Time or a local time with a local time identifier) to the HLR at step 210. In an alternative operation, the serving MSC may return this information directly to the SCP. Finally, at step 212, the HLR returns the location information of the mobile unit and its time stamp to the SCP. From step 212, operation ends.

Figure 3:
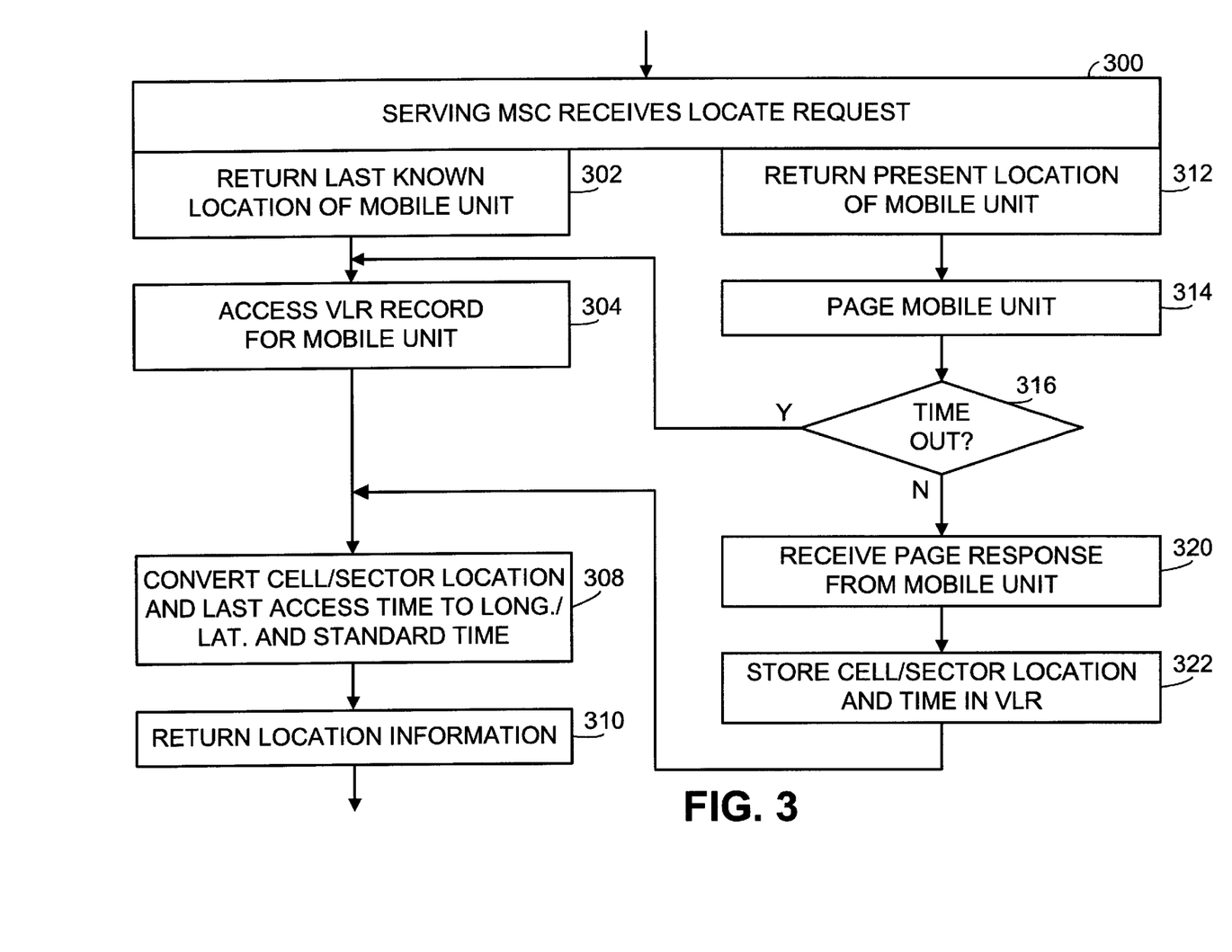
FIG. 3 is a logic diagram illustrating operation of a mobile switching center of a wireless communication system according to the present invention in determining and returning the approximate location of a mobile unit that it is servicing.

FIG. 3 is a logic diagram illustrating operation of a mobile switching center of a wireless communication system according to the present invention in determining and returning the approximate location of a mobile unit that it is servicing, such operation showing in more detail operations taken at step 208 of FIG. 2. Operation commences at step 300 where the serving MSC receives a locate request from an HLR seeking the location of a serviced mobile unit. Based upon the contents of the locate request, the serving MSC is asked either to return the last known location of the mobile unit (step 302) or to return a present location of the mobile unit (step 312).

If the last known location of the mobile unit is requested at step 302, operation proceeds to step 304 wherein the serving MSC accesses the VLR record for the mobile unit to retrieve the last known location of the mobile unit. At step 304, The VLR accesses the location information which includes the last known cell/sector in which the mobile unit accessed the system and the time at which such access was performed. Operation proceeds to step 308 where the cell/sector location and time stamp of the last access are sent to the serving MSC and converted by the serving MSC to longitude, latitude and standard time information. This information is then returned to the HLR (or SCP) at step 310.

If a present location of the mobile unit is required at step 312, based upon the information contained in the locate request operation process to step 314 where the serving MSC pages the mobile unit using supported paging algorithms in an attempt to locate the mobile unit within its service area. If the mobile unit does not respond within a time-out period at step 316, operation proceeds to step 304 where the existing location information is retrieved from the VLR and returned.

If the mobile unit responds to the page at step 320, the serving MSC stores the cell/sector from which the mobile unit responded at step 322 in the VLR. From step 322, operation proceeds to step 308 wherein the recently acquired location information is returned to the HLR. This, under such operations, the location information returned to the subscriber computer reflects a most recent location of the mobile unit.

Figure 4:
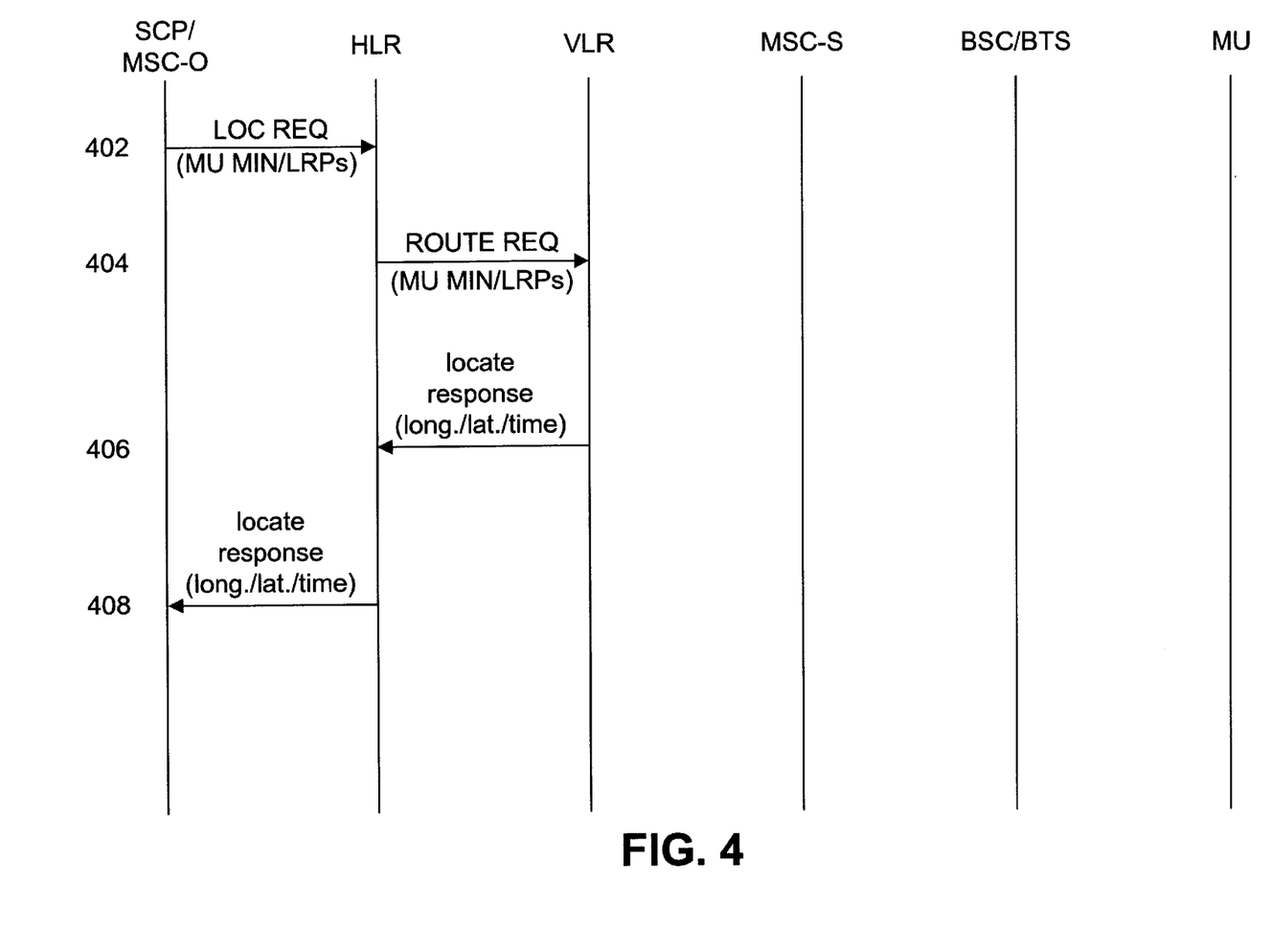
FIG. 4 is a message flow diagram illustrating the flow of messages among a service control point, a home location register, a serving mobile switching center and a visitor location register according to the present invention.

FIG. 4 is a message flow diagram illustrating the flow of messages among a service control point, a home location register, a serving mobile switching center and a visitor location register according to the present invention when the last known location of the mobile unit is returned. At 402, the SCP or the originating MSC sends a locate request to the HLR, whether the SCP or the originating MSC sent the locate request depending upon the particular implementation. At 404, the HLR responds by sending a route request to the serving VLR requesting location information for the mobile unit. Contained in both the locate request from the SCP (MSC-O) and the locate request from the HLR are the mobile units MIN and a parameter that indicates that a last known location of the mobile unit is required.

At 406, the HLR retrieves the requested location information from the VLR for the mobile unit based upon the mobile unit's MIN. The retrieved information provides the cell/sector ID of the cell in which the mobile unit last operated (registered at power up or roaming entry, periodic registration, location area id update, serviced a call or otherwise contacted the wireless communication system) as well as a time stamp corresponding to the last contact. The retrieved information is then converted to longitude and latitude and returned to the HLR at 406 along with the time stamp (that was converted to a standard time or included an indication of the time zone in which the contact was made). At 408, the HLR responds to the SCP with the location response which includes the last known location of the mobile unit (longitude and latitude) and a corresponding time stamp.

Figure 5:
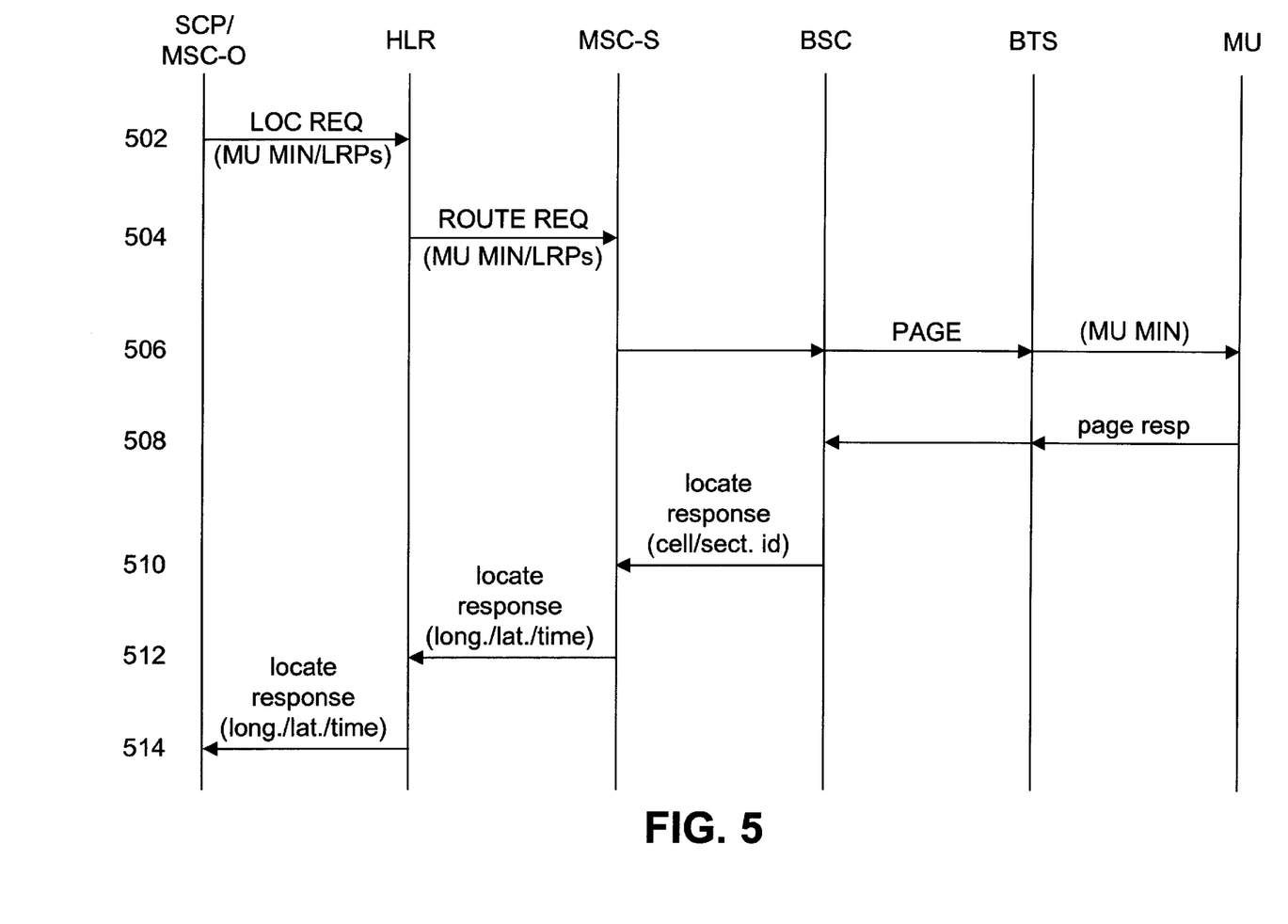
FIG. 5 is a message flow diagram illustrating the flow of messages among a service control point, a home location register, a serving mobile switching center, a base station controller, a base station and a mobile unit according to the present invention.

FIG. 5 is a message flow diagram illustrating the flow of messages among a service control point, a home location register, a serving mobile switching center, a base station controller, a base station and a mobile unit according to the present invention during an operation in which the present location of a mobile unit is determined. At 502, the SCP or the originating MSC sends a locate request to the HLR. At 504, the HLR responds by sending a route request to the serving MSC, requesting location information for the mobile unit. Contained in both the locate request from the SCP and the locate request from the HLR are the mobile units MIN and a parameter that indicates that a current location of the mobile unit is required.

At 506, the serving MSC initiates a page for the mobile unit based upon the MIN of the mobile unit. Standard paging techniques may be employed to page the mobile unit within the service are of the serving MSC. At 508, the mobile unit responds to the page from a particular cell/sector serviced by the serving MSC, such response made to one of the BSCs serviced by the serving MSC. The BSC forwards the page response to the serving MSC, identifying the cell/sector from which the mobile unit responded at 510. The serving MSC then converts the cell/sector information to longitude and latitude and returns the information to the HLR at 512 along with the current time stamp (that was converted to a standard time or included an indication of the time zone in which the contact was made). At 514, the HLR responds to the SCP with the location response which includes the current location of the mobile unit (longitude and latitude) and a corresponding time stamp.

Figure 6A:
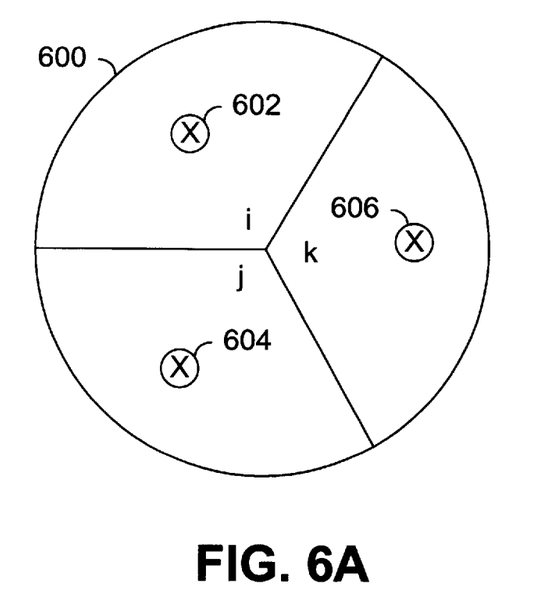
FIGS. 6A and 6B are diagrams illustrating cells and sectors and how assumptions are made in assuming the location of a mobile unit operating within the cells and sectors.
Figure 6B:
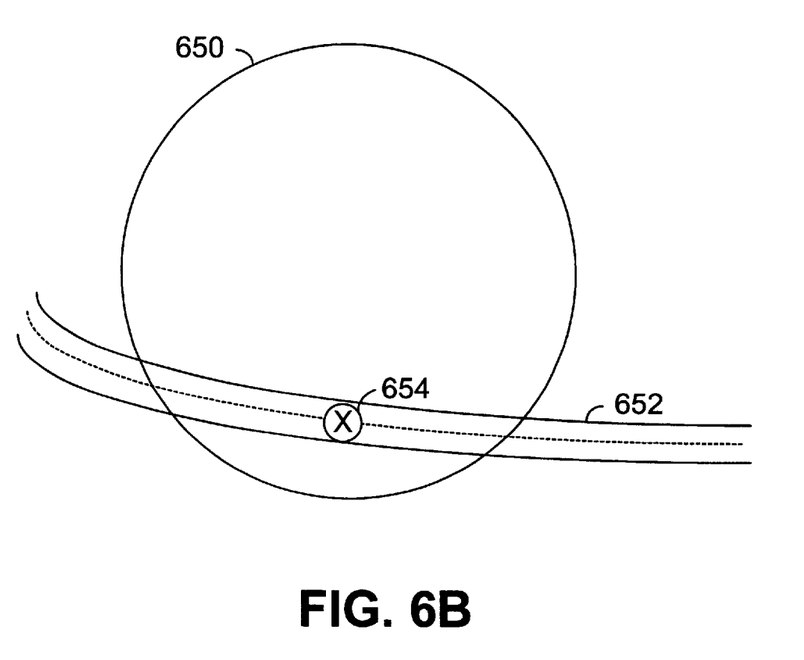

FIGS. 6A and 6B are diagrams illustrating cells and sectors and how assumptions are made in assuming the location of a mobile unit operating within the cells and sectors. Referring now to FIG. 6A, a first technique that may be employed to approximate the location of a mobile unit within a cell/sector from which the mobile unit contacts the wireless communication system is to determine the center of area of the cell/sector. For a non-sectorized cell, the center of area of the cell is typically the location of the antenna servicing wireless communications within the cell. In a sectorized cell, however, the shape of the sector will affect the center of area within the sector. Examples of the centers of the sectorized cell 600 are shown as centers of area 602, 604 and 606. However, if the sectors are of differing segment shapes, the center of area would of course be different.

FIG. 6B illustrates a cell 650 through which a highway 652 passes. In this cell 650, a significant portion of the mobile unit traffic does not leave the highway 652 while the mobile unit is in the cell 652. Thus, an assumption is made for the cell that if a mobile unit is in the cell it is on a midway point 654 on the highway 652 within the cell. Thus, responses to locate requests for mobile units operating within the cell 650 will include the longitude and latitude of the midway point on the highway.

When other significant structures exist within a serviced cell, e.g., a mall, industrial park, etc., within which a substantial portion of the traffic in the cell operates, an assumption may be made and justified to consider the latitude and longitude of the structure to be the location of a mobile unit operating within the cell.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method of providing location information for a mobile unit operating in a wireless communication system, the method comprising:

receiving a locate request for the mobile unit, wherein the locate request includes parameters indicating whether to return a current location of the mobile unit or to return a last known location of the mobile unit;

forward the locate request to a mobile switching center serving the mobile unit;

when the locate request includes a request for a last known location of the mobile unit, retrieving a cell/sector identification of the last known location of the mobile unit;

when the locate request includes a request for a current location of the mobile unit, paging the mobile unit and receiving a page response from the mobile unit, the page response indicating a cell/sector identification in which the mobile unit currently operates;

converting the cell/sector identification into a longitude and a latitude; and returning the longitude and the latitude in response to the locate request.

2. The method of claim 1, wherein the locate request is received from a service control point.

3. The method of claim 2, wherein the service control point receives the locate request from a subscriber computer via a coupled network.

4. The method of claim 1, further comprising:

determining a time stamp that corresponds to the location of the mobile unit; and returning the time stamp with the longitude and latitude.

5. The method of claim 4, wherein the time stamp is converted to standard time.

6. The method of claim 1, wherein in converting the cell/sector identification into a longitude and a latitude, a center of area for the corresponding cell/sector is assumed to be the location of the mobile unit.

7. The method of claim 1, wherein in converting the cell/sector identification into a longitude and a latitude, a physical feature located within the corresponding cell/sector is assumed to be the location of the mobile unit.

8. A wireless communication system comprising:

a home location register that receives a locate request for a mobile unit;

a serving mobile switching center that receives the locate request from the home location register;

a visitor location register coupled to the serving mobile switching center that contains a last known cell/sector identification for a cell/sector serving the mobile unit;

when the locate request includes a request for a last known location of the mobile unit, the serving mobile switching center retrieving a cell/sector identification of the last known location of the mobile unit;

when the locate request includes a request for a current location of the mobile unit, the serving mobile switching center paging the mobile unit and receiving a page response from the mobile unit, the page response indicating a cell/sector identification in which the mobile unit currently operates;

the serving mobile switching center converting the cell/sector identification into a longitude and a latitude; and the serving mobile switching center returning the longitude and the latitude to the home location register.

9. The wireless communication system of claim 8, further comprising a service control point that interfaces with a subscriber computer, that receives the locate request from the subscriber computer and forwards the locate request to the home location register, and that receives the longitude and latitude from the home location register and returns the longitude and latitude to the subscriber computer.

10. The wireless communication system of claim 9, wherein the service control point receives the locate request from the subscriber computer via a coupled network.

11. The wireless communication system of claim 8, wherein:

the serving mobile switching center determines a time stamp that is associated with the cell/sector; and the serving mobile switching center returns the time stamp with the longitude and latitude.

12. The wireless communication system of claim 11, wherein the time stamp is converted to standard time.

13. The wireless communication system of claim 8, wherein in converting the cell/sector identification into a longitude and a latitude, a center of area for the cell/sector is assumed to be the location of the mobile unit.

14. The wireless communication system of claim 8, wherein in converting the cell/sector identification into a longitude and a latitude, a physical feature located within the cell/sector is assumed to be the location of the mobile unit.

15. The wireless communication system of claim 8, wherein the locate request includes parameters indicating whether to return a current location of the mobile unit or to return a last known location of the mobile unit.

* * * * *